H. C. FORD.
CALCULATING INSTRUMENT.
APPLICATION FILED JUNE 15, 1918.
1,332,210.
Patented Mar. 2, 1920.
3 SHEETS—SHEET 1.
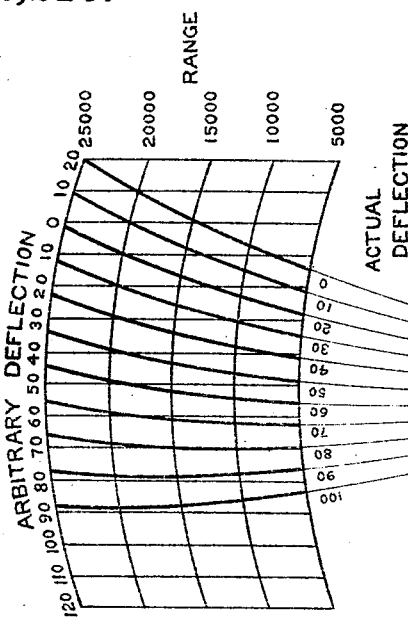
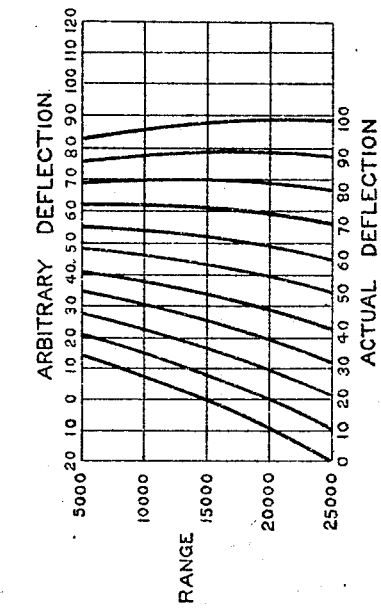
INVENTOR
Hannibal C Ford
BY
Henry Murphy
ATTORNEY

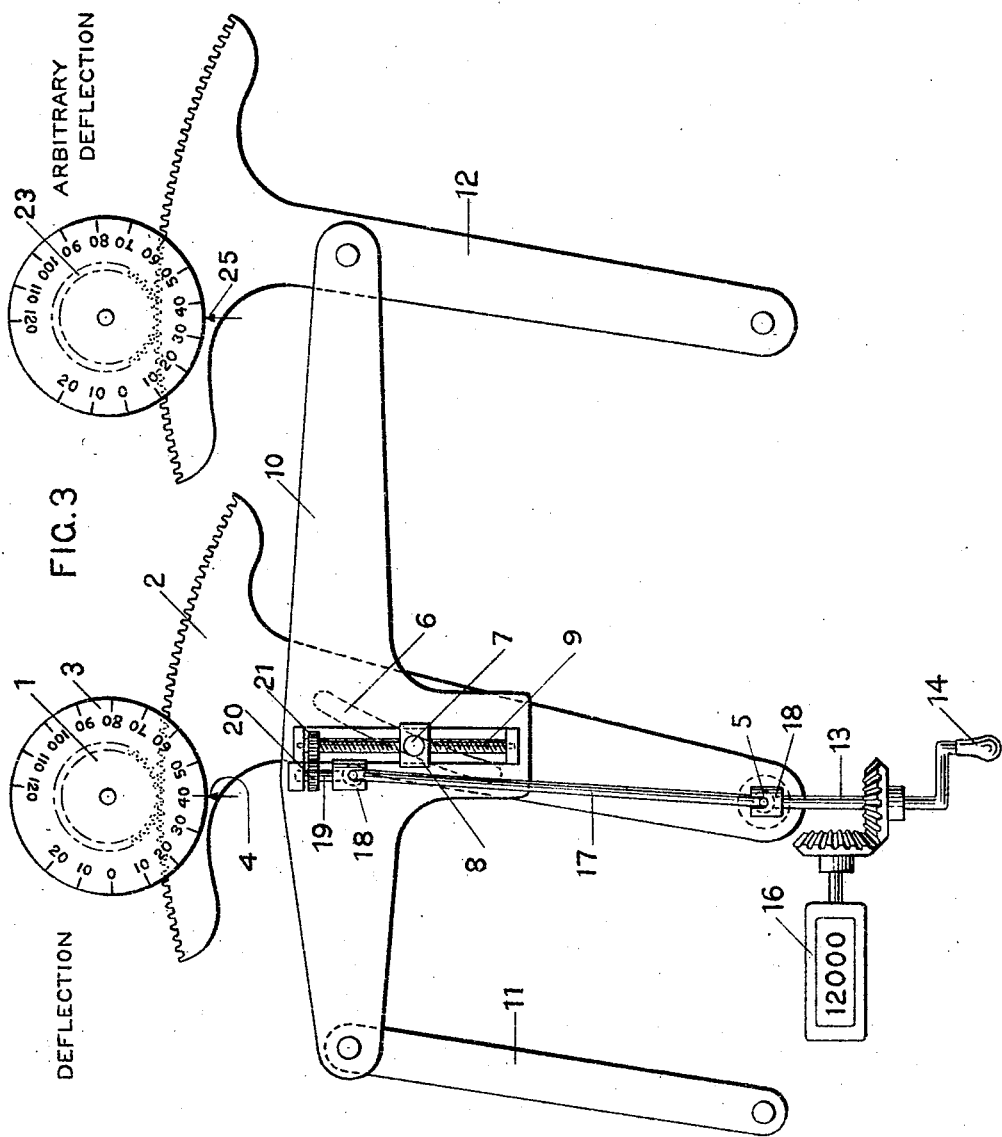

H. C. FORD.
CALCULATING INSTRUMENT.
APPLICATION FILED JUNE 15, 1918.
1,332,210.
Patented Mar. 2, 1920.
3 SHEETS—SHEET 3.
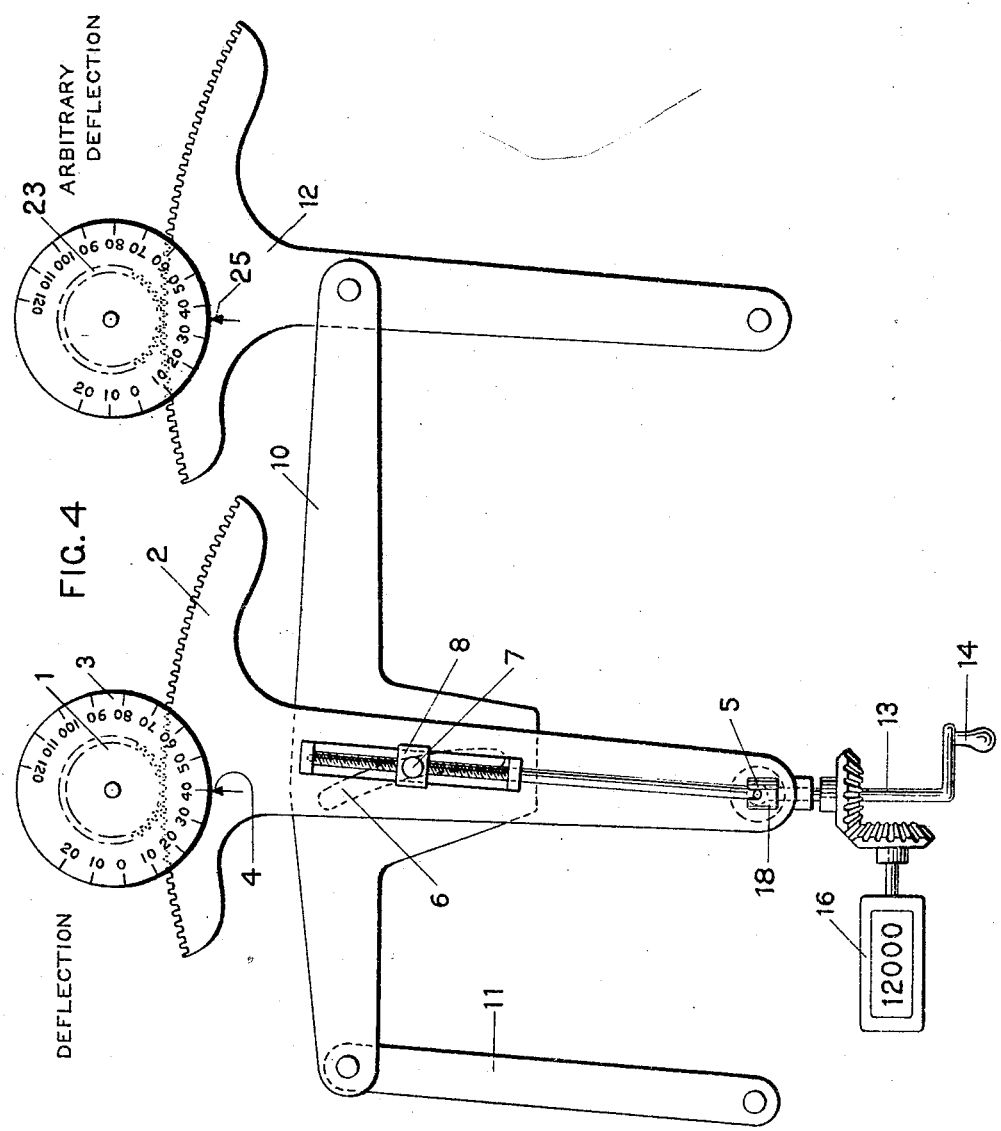

UNITED STATES PATENT OFFICE.

HANNIBAL C. FORD, OF JAMAICA, NEW YORK, ASSIGNOR TO FORD INSTRUMENT COMPANY, INC., OF NEW YORK, N. Y., A CORPORATION OF NEW YORK.

CALCULATING INSTRUMENT.

1,332,210.  Specification of Letters Patent.  Patented Mar. 2, 1920.

Application filed June 15, 1918. Serial No. 240,218.

*To all whom it may concern:*

Be it known that I, HANNIBAL C. FORD, a citizen of the United States, residing at Jamaica, in the borough of Queens, State of New York, have invented new and useful Improvements in Calculating Instruments, of which the following is a specification.

This invention relates to calculating instruments or machines, and has for its general object the provision of an instrument which will indicate the values of the different abscissas or ordinates of the different points upon any one of a series of curves having substantially the same curvature but which occupy different positions with respect to the axes of abscissas and ordinates.

In the specific embodiment of the invention shown, the instrument is utilized to determine the angular or arbitrary deflection which is the angle that a gun should be displaced to the left or right from a line of sight between two relatively moving objects, to correct for the relative displacement of the objects in a known time interval and also if desired, to correct for the drift of a projectile. The invention will be clear from the detailed description hereinafter to follow and the particular features thereof will be pointed out in the appended claims.

In the drawings:—

Figure 1 is a chart which is at present used with the so-called arbitrary deflection board.

Fig. 2 is a view similar to Fig. 1 showing the chart revised to adapt it for use in one type of instrument.

Fig. 3 is a view somewhat dagrammatic of one embodiment of the invention, and

Fig. 4 is a similar view of another embodiment of the invention.

As is well known, the "deflection" between two relatively moving objects such as two ships, is their rate of movement at right angles to the line of sight between the two ships and is usually given in terms of "knots per hour." It has become the general practice to convert this deflection into an angle through which a gun is displaced from the line of sight to correct for the distances the two ships will move during the time of flight of a projectile, depending upon the range between the ships. An angular correction for the drift of the projectile at this range is also introduced. To accomplish this an arbitrary deflection scale has been devised which has for its unit of measurement a "mil," which is an angle whose tangent is .001. For convenience this arbitrary deflection scale has been graduated so that 50 corresponds to a line of sight or fire and all readings below 50 indicate that the gun is to be swung to the left and all readings above 50 indicate that the gun is to be swung to the right. The manner in which this scale has heretofore been used will be clear from Fig. 1.

The curves shown in this view are each indicated by a numeral at the bottom of the chart, which numerals indicate the deflection in knots per hour, the numeral 50 indicating zero knots deflection and the numeral 30 indicating 20 knots deflection to the left, and the numeral 80 indicating 30 knots deflection to the right, etc. These curves which are the drift curves of projectile are plotted with the ranges as ordinates and mils or arbitrary deflection units which are indicated at the top of the chart, the numeral 50 indicating zero mils or zero arbitrary deflection and the numeral 30 indicating 20 mils or 20 arbitrary deflection units to the left and the numeral 80 indicating 30 mils or 30 arbitrary deflection units to the right.

To use this chart the curve corresponding to the actual deflection is selected as for example, if the actual deflection is 10 knots per hour to the left, the curve marked 40 would be selected and a point upon the curve corresponding to the range between the ships is selected and the abscissa of this point is read to the closest division of arbitrary deflection or mil as is indicated by the vertical line upon the chart. This angle is then transmitted to the gun, which is corrected by angularly displacing it an equivalent amount, which will automatically give the proper correction for the displacement of the two objects during the time of flight of the projectile which is read in terms of range from the scale and will also correct for the drift of the projectile.

Referring now to Fig. 2, the chart shown in this view is similar to the chart shown in Fig. 1 with the exception that the curves have been reversed and extended to intersect at a common point A. It should be noted that all of the curves are of substantially the same curvature and that the angles between the extension of the curves meeting at the common point A are substantially equal, which permits this chart to be re-produced in a suitable calculating instrument as will now be described.

Referring now to Fig. 3, one instrument which is desired for this purpose is disclosed. The instrument comprises a gear 1 which is displaced through equal angles for equal changes in knots per hour deflection which gear actuates a sector 2 which is pivoted at 5 corresponding to the point A in Fig. 2 and which is provided with teeth meshing with the gear 1 so that the angular positions of the sector 2 will correspond to the angular positions of the extensions of the curves shown in Fig. 2. The gear 1 is preferably provided with an indicating dial 3 which is read opposite the pointer 4 and may either be moved by hand so that the indication corresponding to the knots per hour deflection between the two ships will appear opposite the pointer or it may be automatically moved as is disclosed in my application for range keeper, filed Dec. 4, 1917, and identified by Serial No. 207,357.

As is evident, the indicating dial 3 is graduated to correspond to the indications shown at the bottom of the chart in Figs. 1 and 2, that is, so that the reading 50 corresponds to zero knots deflection.

Formed in the sector 2 is a cam groove 6 whose curvature corresponds to the curvature of the curves shown in Fig. 2 and since all of these drift curves have substantially the same curvature, a single cam slot may be utilized to represent each one of them, within the limits of permissible errors for an instrument of this character. It will therefore be seen that by the displacement of the gear 1, proportional to the knots deflection as described, the sector will be angularly displaced a similar amount and the cam groove 6 will have a position corresponding to one of the curves shown in Fig. 2, corresponding to the knots or actual deflection indicated by the pointer 4 as for example, in Fig. 3 the indicator 3 shows that the cam slot 6 in the sector 2 corresponds to the groove marked 40 in Fig. 2. It will also be seen that by displacing the gear 1 the cam slot 6 may be displaced to a position corresponding to any of the other curves shown on the chart. Sliding in the cam slot 6 is a pin 7 which is mounted upon a traveling block 8 which is displaced by rotating a screw-shaft 9 through which the block passes. The screw-shaft 9, the block 8 and the pin 7 are carried in a slot in a link 10 which is connected at one end to a link 11 and at the other end to a second sector 12. The block 8 is displaced proportionally to the range by means of a shaft 13 which may be rotated manually by a handle 14. The shaft 13 is connected to the screw-shaft 9 through shafts 13 and 19 by universal joints 18. The shaft 13 may also actuate a range counter 16. As is evident, instead of driving the shaft 13 by hand it may be driven by a range integrator such as is disclosed in my application for range keepers before mentioned. It will therefore be seen that the pin 7 is displaced proportional to the range and is advanced upwardly with increasing ranges to correspond with Fig. 2. The position of the pin 7 therefore determines the value of the ordinate of any point upon the selected curve, and the abscissa of this point gives the value in mils or units of arbitrary deflection that the angle through which the line of sight between the two must be displaced to correct for the displacements of the objects during the time of flight of the projectile corresponding to the range and also to correct for the drift of a projectile for the range.

To obtain the value of this abscissa the sector 12 is utilized for it is evident that since the links 10, 11 and 12 form a parallel linkage, the angular displacement of the sector 12 will correspond to the value of abscissa of the points defined by the pin 7 or in other words, the displacement of the sector 12 is proportional to the value of arbitrary deflection. This sector is therefore utilized to drive an indicating mechanism comprising a gear 23 which carries an indicating dial read opposite a pointer 25, the reading opposite the pointer giving the value of the correction in units of arbitrary deflection to be applied to the gun.

Referring now to Fig. 4, instead of placing the cam slot 6 in the sector, this cam slot 6 is placed in the link 10 which requires it to be reversed as shown. The sliding block 8 is then carried by the sector and the pin 7 carried by the sliding block, rides in the cam 6. Otherwise the construction is the same as disclosed in Fig. 3 and its operation is similar.

From the preceding description it is evident that the present invention is in reality a prediction devce, somewhat similar in its function to the range predictor which is disclosed in my co-pending application, Serial No. 240,217. The main distinction between the two instruments is that in the present invention the prediction not only includes a prediction due to the displacement of the moving objects during a time interval, but also includes the drift of a projectile for the range between the two objects and makes it possible to convert the present type of arbitrary deflection scale into a direct reading instrument.

It is also evident that in the instrument described the time of flight of a projectile is regarded as substantially proportional to the range and it is therefore intended that in the claims the statement that a part is displaced proportionally to the range is sufficiently broad to cover a part which is displaced proportional to the time of flight of a projectile.

I claim:—

1. In an instrument of the class described, a cam having the general curvature of any one of a series of curves of a chart plotted in respect to the coördinate axes, means for displacing said cam to occupy a position corresponding to any one of said curves, a part having a sliding engagement with said cam, means for displacing said part to a position corresponding to one coördinate of a point of the curve and means for determining the other coördinate of the point connected to said part.

2. In an instrument of the class described, a part having a movement proportional to the deflection between two relatively moving objects, a part having a displacement proportional to the range between the objects and a predictor associated with said part having a displacement proportional to the displacement of said objects during a time of flight of a projectile corresponding to the range.

3. In an instrument of the class described, a part having a movement proportional to the deflection between two relatively moving objects, a part having a displacement proportional to the range between said objects, and mechanism connected to each of said parts having a movement proportional to both of said parts.

4. In an instrument of the class described, an angularly displaceable member, means for displacing said member, proportional to the deflection between two relatively moving objects, a part having a displacement proportional to the range and a predictor associated with said part for determining the displacement.

5. In an instrument of the class described, a member, a cam having the shape of a drift curve of a projectile carried by said member, a sliding part co-acting with said cam, means for displacing said part proportional to range, means for displacing said member proportional to the deflection and an indicator connected to said part.

6. In an instrument of the class described, a member, a cam having the shape of a drift curve of a projectile, carried by said member, a sliding part co-acting with said cam, means for displacing said part proportional to range, means for displacing said member proportional to the deflection and an angle measuring deflection indicator connected to said part.

7. In an instrument of the class described, a pair of swinging members, a cam having the shape of a drift curve of a projectile carried by one of said members, a sliding part carried by the other of said members co-acting with said cam, means for displacing one of said members proportional to the deflection, means for displacing said part proportional to the range and a deflection indicator connected to one of said members.

8. In an instrument of the class described, a pair of swinging members, a cam carried by one of said members having a curve corresponding to the drift of the projectile, a sliding part carried by the other of said members co-acting with said cam, means for displacing said part proportional to range and an angle measuring indicator connected to the other of said members.

HANNIBAL C. FORD.